United States Patent [19]

Habicht et al.

[11] 4,396,903

[45] Aug. 2, 1983

[54] ELECTRO-OPTICAL SYSTEM FOR CORRELATING AND INTEGRATING IMAGE DATA FROM FRAME-TO-FRAME

[75] Inventors: John C. Habicht, Columbia; Arden R. Helland, Pasadena, both of Md.

[73] Assignee: Westinghouse Electric Corp., Pittsburgh, Pa.

[21] Appl. No.: 268,544

[22] Filed: May 29, 1981

[51] Int. Cl.³ .............................................. G06K 9/48
[52] U.S. Cl. ................................. 382/9; 343/5 MM; 382/22; 382/42; 358/96; 382/62
[58] Field of Search .......... 340/146.3 AC, 146.3 MA, 340/146.3 H, 146.3 R, 146.3 Q, 146.3 D, 146.3 SG; 364/515, 444, 456, 728; 358/93, 96, 103, 105, 107, 108, 109; 343/5 CE, 5 CM, 5 DP, 5 MM; 244/3.15–3.17

[56] References Cited

U.S. PATENT DOCUMENTS

| | | | |
|---|---|---|---|
| 3,636,513 | 1/1972 | Tisdale | 340/146.3 AC |
| 3,638,188 | 1/1972 | Pincoffs et al. | 340/146.3 AC |
| 3,748,644 | 7/1973 | Tisdale | 340/146.3 Q |
| 4,216,526 | 8/1980 | Karwowski | 364/515 |
| 4,231,037 | 10/1980 | Long | 343/5 CE |
| 4,320,415 | 3/1982 | Jones | 364/515 |
| 4,350,998 | 9/1982 | Verhoeven | 364/515 |

*Primary Examiner*—Leo H. Boudreau
*Attorney, Agent, or Firm*—W. E. Zitelli

[57] ABSTRACT

An electro-optical system which integrates the image pattern information, extracted from a plurality of image frames and identified as belonging to a common candidate object, to form a composite image pattern of the candidate object which may be accurately classified with respect to a reference object image pattern is disclosed. More specifically, the formed composite image pattern of the candidate object is correlated with each image pattern of a set of reference object image patterns to generate a corresponding set of correlation values. Preferably, the largest of the correlation values is selected for a comparison with a threshold correlation value. In the event the generated correlation value exceeds the threshold correlation value, the candidate object represented by the composite image pattern is classified as the referenced object corresponding to the selected correlation value. Another aspect of the electro-optical system permits the threshold correlation value to be adaptively selected in accordance with the number of frames integrated to form the composite image pattern under consideration for classification. In addition, a final classification of the candidate object may include the smoothing of a plurality of classification decisions generated throughout the integration sequence during which a number of composite image patterns are formed.

13 Claims, 14 Drawing Figures

ELECTRO-OPTICAL SYSTEM FOR CORRELATING AND INTEGRATING IMAGE DATA FROM FRAME-TO-FRAME

BACKGROUND OF THE INVENTION

The present invention relates to electro-optical systems for pattern recognition, in general, and more particularly, to a system for correlating and integrating extracted image pattern areas from the image information of a plurality of frames to form a composite image pattern of at least one candidate object for classification in accordance with pre-specified image patterns of reference objects.

Typical image processing recognition systems involving image pre-processing, feature extraction and object classification are described in the following U.S. Patents:

U.S. Pat. No. 3,636,513, issued Jan. 18, 1972 to Glenn E. Tisdale and entitled "Pre-Processing Method and Apparatus for Pattern Recognition;"

U.S. Pat. No. 3,638,188, issued Jan. 25, 1972 To Peter H. Pincoffs et al. and entitled "Classification Method and Apparatus for Pattern Recognition Systems;" and U.S. Pat. No. 3,748,644, issued July 24, 1973 to Glenn E. Tisdale and entitled "Automatic Registration of Points in Two Separate Images," all being assigned to the same assignee as the instant application. The classification techniques of these type systems are generally based on the information contained in line segments which define a short contrast gradient boundary between contrasting regions in the image of a video frame. In these systems, classification accuracy is considered best when the candidate objects are relatively large and have high contrast to the adjoining background. However, under more adverse conditions, like when the object size is small due to long range, when the contrast is poor, when the signal-to-noise ratio (S/N) is low, or when partial obscuration or background merging with the candidate object occurs, for example, the classifier accuracy may be seriously degraded especially because under these adverse conditions, there may be a low number of valid line segments available and a general randomness of the line segments may exist as a result of noise.

Several techniques exist for reducing the sensitivity to random noise and many of them involve the use of integration methods. One such technique employs spatial filters which operate directly on the image of a video frame to replace the intensity amplitude of a specific picture element (pixel) of the image with another amplitude value derived as a function of the intensity amplitudes of the pixels in the neighborhood of the specific pixel to reduce the effect of random noise on the individual pixels of an image area constituting a portion of a video frame. While this filtering technique generally improves image quality of a video frame, it generally is limited to rather small pixel areas or neighborhoods of the video frame because image resolution quickly deteriorates as larger-area spatial filters are applied.

Another integration technique, generally referred to as temporal filtering, takes advantage of the relatively independent data provided by sequential video frames or samples of the same scene or field of view typically generated by electro-optical sensors included in many imaging systems. Some forms of integration utilizing temporal filter techniques operating on the image data of sequentially generated video frames at the pixel level are known to improve detection and classification performance. However, the process generally requires precision positional registration from frame-to-frame (i.e. a fraction of a pixel accuracy) for all of the video frames or samples to be integrated. Consequently, these techniques are considered very complex especially when both the electro-optical sensor and dynamic object motion within the scene are considered in the classification process. Nonetheless, just the combination of video frame data from all of the samples to be integrated at the pixel level requires significant computational capacity even without the aforementioned considerations.

Another filtering method sometimes used in pattern recognition and classification systems, generally referred to as output decision smoothing, involves combining the results of the classification process from several sequential frames to resolve possible conflicts therein. Usually, only corresponding objects are considered for correlation, thereby reducing greatly the registration requirements normally associated with integrating frame-to-frame information. However, the advantage provided by the decision smoothing process is very sensitive to the accuracy of the individual decisions of the classification process. Therefore, decision smoothing is generally considered useful when high individual classification accuracy can be achieved. Under realistic conditions, most existing classification techniques are not considered accurate enough to permit useful improvement by decision smoothing.

Apparently, what is needed is a simpler method of integrating image information from frame-to-frame which can eliminate the precision registration and reduce the complex processing generally required for the present integration methods. It is felt that the formation of an integrated composite image pattern of a candidate object will provide a more complete description thereof and minimize the effect of individual random pattern features caused by noise. It is expected that the composite image pattern will naturally reinforce the primary features of a candidate object, since they occur more frequently, thus improving the classification process. Furthermore, if there is obscuration or background merging with respect to a candidate object in a video frame, any sample-to-sample integration will tend to result in a more complete object definition in an integrated composite image pattern than would be available from an individual video frame. Still further, with an improvement in classification accuracy, especially under adverse conditions where performance is most critical, decision smoothing may become a useful and viable extension to the classification process providing further improvements thereof even under realistic conditions.

SUMMARY OF THE INVENTION

In an electro-optical system for processing image information of a plurality of frames, sequentially generated from an electro-optical sensor and representative of a field of view thereof, candidate object image patterns in the image frames are extracted and classified in accordance with a set of reference image patterns and a signature feature set associated with each reference pattern. The system is operative to extract image patterns belonging to candidate objects from each of the plurality of sequentially generated frames and to derive a set of signature features associated with each image pattern extracted. In accordance with the present invention, a first means is provided for correlating the image patterns extracted from frame-to-frame to identify extracted image patterns belonging to common candidate objects. The correlated extracted image patterns belonging to the identified common candidate objects are integrated by another means to form a composite image pattern of each candidate object and a composite signature feature set associated therewith. Another means is provided for correlating a formed composite image signature feature set with the signature feature sets of selected reference object image patterns to generate a corresponding set of correlation values. A candidate object is classified as a reference object by still another means based on a comparison between a selected one of the generated correlation values associated with the candidate object and a threshold correlation value.

In accordance with another aspect of the invention, a threshold correlation value is selected from a predetermined set of values corresponding to the number of sequentially generated frames used by the integrating means in forming the composite image pattern of the candidate object being classified. In accordance with still another aspect of the invention, the classifying means may further classify the candidate object as a reference object based on the number of frames in the integration sequence for which a classification of the candidate object is accomplished.

DESCRIPTION OF THE PREFERRED EMBODIMENT

Figure 1:
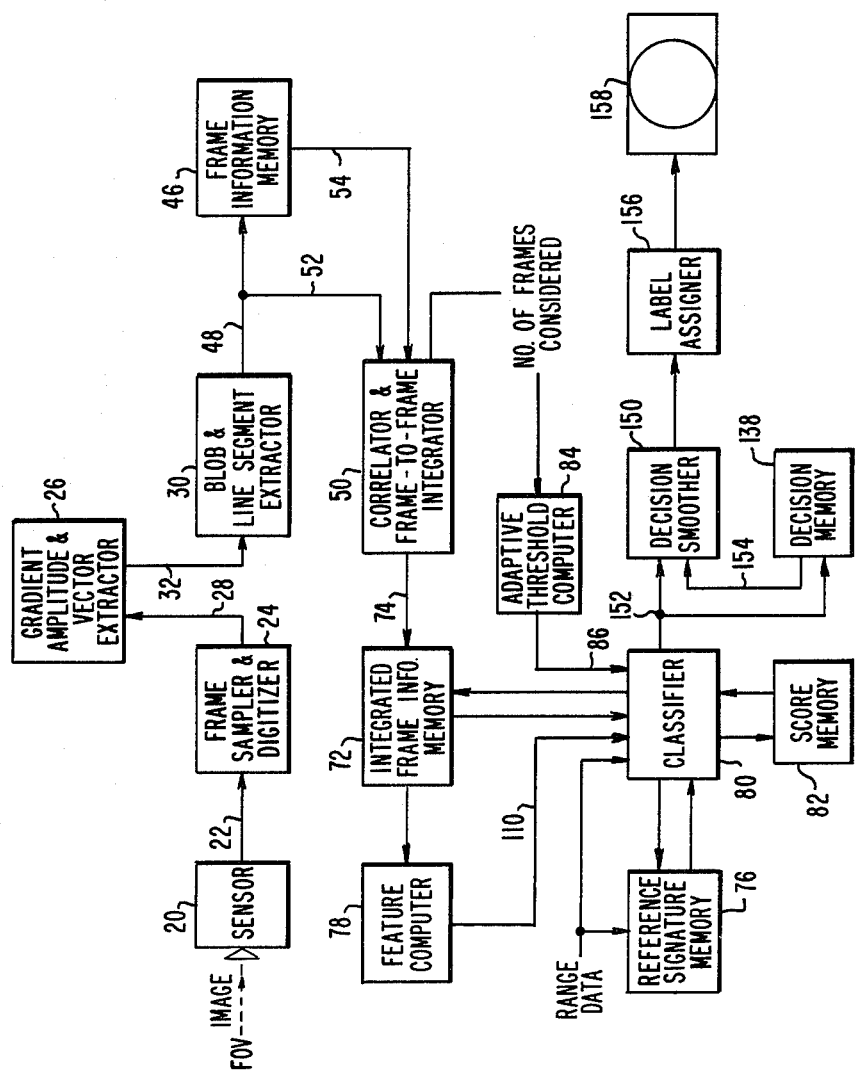
FIG. 1 is a schematic block diagram of an electro-optical system suitable for embodying the principals of the present invention.

Referring to the schematic block diagram embodiment depicted in FIG. 1, an image sensor or scanner 20, like a conventional television camera (TV) or a forward looking infrared (FLIR) device, for example, optically detects an image in the field of view (FOV) 22 thereof and converts the detected image into a representative electrical signal. In most cases, the electrical signal is provided in a conventional raster scan frame format over signal line 22 to a frame sampler and digitizer unit 24. Typically, the sensor 20 may generate on the order of 30 frames of image information per second. However, the electro-optical system may only desire to operate on a fraction of that amount. For example, the frame sampler 24 of the present embodiment may use only one frame out of three for digitization. The digitizer portion of the unit 24 may divide the image information of each sample or frame into on the order of one-half a million picture elements (pixels). In addition, each picture element may be assigned an index, with respect to a frame reference point, and a digital code representative of the intensity level information thereof.

Figure 3:
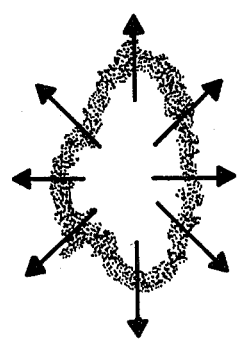
FIG. 3 is a sketch exemplifying gradient vectors corresponding to the cluster of pixels depicted in FIG. 2.
Figure 2:
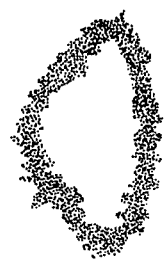
FIG. 2 is a sketch of an exemplary cluster of pixels having an intensity gradient with their surrounding pixels in an image frame of information.

The pixel information derived by the unit 24 may next be provided to a gradient amplitude and vector extractor unit 26 over signal line 28. For each sequentially generated frame of information from the unit 24, the extractor unit 26 establishes the contrast gradient of each of the pixels with respect to their neighboring pixels. In addition to the gradient amplitude, the extractor unit 26 may also identify the direction of the contrast gradient from one pixel to another. For example, in the present embodiment, the gradient direction is chosen to go from a lighter to a darker intensity level. An example of a cluster of pixels having an intensity gradient with their surrounding pixels in an example image frame is depicted in the sketch of FIG. 2. The dark spots in the sketch of FIG. 2 are representative of pixels with a high gradient amplitude with respect to their neighbors. It is understood that the sketch represents only a small portion of a frame of pixel information, constituting on the order of 500 to 1000 pixels in a typical case. Derived gradient directions for the pixels in the exemplary cluster is illustrated by the arrowed lines shown in the sketch of FIG. 3. Note that the gradient vectors depicted in FIG. 3 are in the direction going from lighter to darker intensities, thus indicating that, for this example, the region inside the cluster of pixels is lighter than those outside the cluster.

Figure 4:
FIG. 4 is a graphical illustration depicting the extraction of a pixel cluster in an image frame and the extraction of line segments therefrom.
Figure 5:
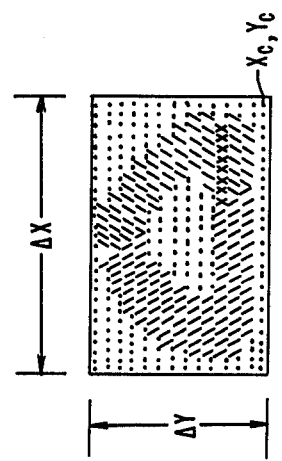
FIG. 5 is a sketch which exemplifies the definition of an indexed area or blob including an extracted pixel cluster.

Once having extracted the gradient amplitude and direction information for the pixels of a frame, the unit 26 provides the data to a conventional blob and line segment extractor 30 over a signal line 32. The extractor 30 identifies each pixel cluster in the frame much in the manner as that graphically illustrated by the dashed lines in the sketch of FIG. 4, the region within the dashed lines generally being referred to as the thickened gradient. The extractor 30 may define an area of pixels about the cluster region and index the area with respect to a reference point in the image frame. In the present embodiment as illustrated by the sketch of FIG. 5, the indexed area is made rectangular with the dimensions $\Delta x$ and $\Delta y$ and is sometimes referred to as a blob. The index of the defined area $\Delta X$, $\Delta Y$ is the index of the pixel located in the lower right-hand corner of the indexed area with respect to the frame reference point. In cartesion coordinates, the index may be denoted as $X_C$, $Y_C$. In FIG. 5, the dots in the defined area $\Delta X$, $\Delta Y$ are representative of pixel locations having insignificant gradient amplitude and the slashed lines are representative of pixels having thickened gradients.

Figure 6:
FIG. 6 is a sketch illustrating a pattern of line segments extracted from the pixel cluster identified in the sketch of FIG. 4.

Once the blobs have been extracted from an image frame, the extractor 30 identifies selected gradient edges within each indexed area to form line segments. An example of this is shown graphically in FIG. 4 by the darkened line within a pixel cluster. The pixels within the darkened line are normally referred to as having maximized gradient levels. From the maximized gradient, the extractor unit 30 may extract line segments to form an image pattern within each indexed area. An example of an image pattern of line segments is shown by the sketch of FIG. 6.

In addition to extracting the line segments of each indexed area, the extractor unit 30 additionally provides signature features corresponding to each line segment of the area. In the present embodiment, the extractor unit 30 derives a positional index for each line segment within a defined area with respect to a point of reference within the area. Referring to the sketch of FIG. 7, a typical defined area $\Delta x$, $\Delta y$ having an index $X_C$, $Y_C$ with respect to the frame reference point may be provided with an area reference point 34 which may be located preferably in the center of the rectangle $\Delta x$, $\Delta y$. The coordinates of the area reference point 34 may be derived as a function of the frame index $X_C$, $Y_C$ and the width $\Delta x$ and height $\Delta y$ of the defined area.

Figure 7:
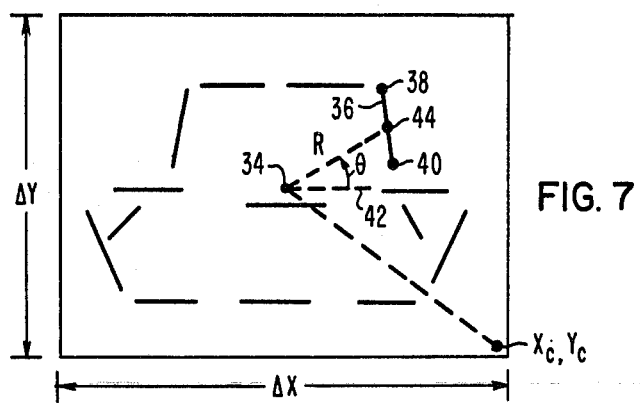
FIG. 7 is a sketch illustrating a derivation of the line segment positional indices of a typical indexed area suitable for use in the embodiment of FIG. 1.

The positional index of each line segment of the exemplified defined area $\Delta x$, $\Delta y$ as depicted in FIG. 7 may be derived in accordance with either polar or cartesian coordinates with respect to the area reference point 34. In the preferred embodiment, the line segment positional index is computed in polar coordinates $R$, $\theta$. For example, for the line segment 36, the end points 38 and 40 are determined in polar coordinates with respect to point 34. The polar angle may be measured with respect to an imaginary horizontal line such as that shown by the dashed line 42. After determining the end points 38 and 40, a midpoint 44 of the line segment 36 may be derived in terms of the polar coordinates $R$ and $\theta$. In the present embodiment, it is the positional index of the midpoint of each line segment that is used as the signature feature thereof.

The electro-optical system depicted in FIG. 1 assumes that the cluster of pixels defined by the area $\Delta x$, $\Delta y$ is representative of at least a portion of a candidate object considered for classification. Accordingly, the positional index and gradient vector of each line segment constituting the image pattern of the defined area or blob belongs to the set of signature features of the candidate object for each frame. With these assumptions in mind, the extracted data generated by the unit 30 for each frame may be provided to a buffer memory 46 for correlation with the data from another frame. Since the frames are sequentially generated by the sensor 20, the blob and line segment extracted data may likewise be sequentially generated from frame-to-frame by the extractor unit 30 and passed along to the buffer memory 46. For a more complete understanding of a conventional blob and line segment extraction process, reference is hereby made to the aforementioned U.S. Pat. Nos. 3,636,513; 3,638,188; and 3,748,644 mentioned in the Background section hereabove.

Figure 8:
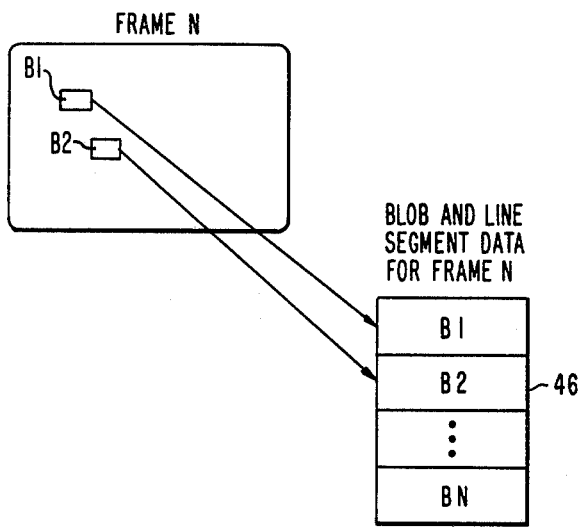
FIG. 8 is a sketch which illustrates the storage of blob and line segment data for an image frame N into prespecified cell blocks of the frame information memory as depicted in the embodiment of FIG. 1.

The sketch of FIG. 8 illustrates the storage of blob and line segment data for an image frame N into prespecified cell blocks of the memory 46, each cell block having an address corresponding to the blob data contained therein. That is, a blob defined by the area B1 is stored in the cell block defined as B1, and the blob defined by the area B2 in frame N is stored in the cell block addressed as B2, and so on.

In accordance with the present invention, the blob and line segment data from two image frames may be provided to a correlator and frame-to-frame integrator unit 50 as shown in the block diagram of FIG. 1. Preferably, the blob and line segment data extracted from a most recent image frame N is correlated with the blob and line segment data from a previous image frame N-1. In the present embodiment, the blob and line segment data extracted from the most recent frame N may be accessed from the signal lines 48 and provided to the unit 50 over lines 52. The blob and line segment data extracted from a previous frame N−1 and stored in the memory 46 may be accessed and provided to the unit 50 over signal lines 54. The unit 50, among other tasks, correlates the blob data from frame-to-frame to identify the extracted image patterns thereof which belong to a common candidate object. The method used in the present embodiment for correlating the blob data from frame-to-frame includes determining an overlap of at least a portion of two indexed areas mutually registered to a common frame reference point which is graphically illustrated in the sketches of FIGS. 9A and 9B.

Figures 9A, 9B:
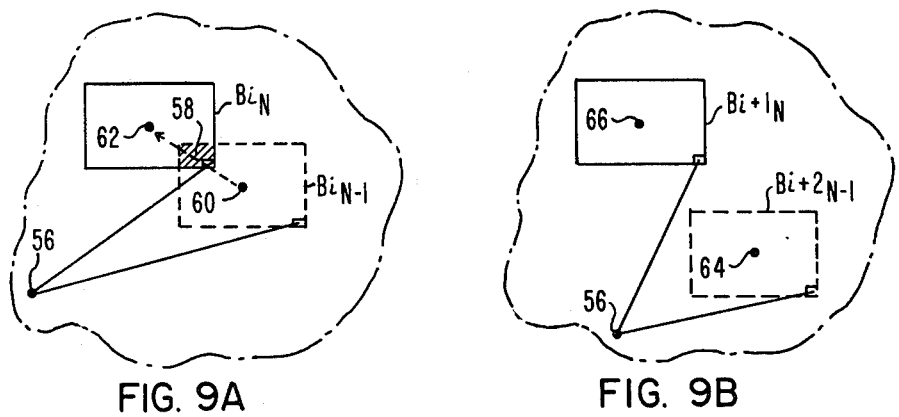
FIGS. 9A and 9B are graphical illustrations which depict a correlation process suitable for use in the correlator unit of the embodiment depicted in FIG. 1.

Referring to FIG. 9A, two blobs extracted from different image frames N and N−1, and denoted as $Bi_N$ and $Bi_{N-1}$, are mutually registered to a common frame reference point 56 utilizing the pixel index of the pixel in the bottom right-hand corner of each indexed area as described hereabove. The areas of the blobs $Bi_N$ and $Bi_{N-1}$ are superimposed in a common image frame to determine if an overlap in area exists. When an overlap is determined, such as that depicted by the shaded area 58 in FIG. 9A, the indexed areas are identified as belonging to a common candidate object and referred to as common indexed areas. As a result of the overlap 58, the area reference point 60 of the extracted blob Bi from the previous frame N−1 may be registered to the area reference point 62 of the blob Bi extracted from the image frame N whereby the indexed areas are superimposed by a common indexed area reference point.

In another example like that shown in the sketch of the FIG. 9B, two extracted blobs Bi+1 extracted from the image frame N and Bi+2 extracted from the image frame N−1 are mutually registered to the common frame reference point 56 in accordance with the pixel located in the lower right-hand corner of each as described hereabove. In this example, the process for determining overlap by the correlator unit 50 identifies that no overlap exists and that the two blobs Bi+1 and Bi+2 do not belong to a common candidate object. As a result, no superimposing is effected and the respective area reference points 64 and 66 thereof may remain in the same indexed relation to the common frame reference point 56. Accordingly, this correlation process may be continued by the unit 50 for all of the blobs in each of the frames N and N−1.

Figure 11:
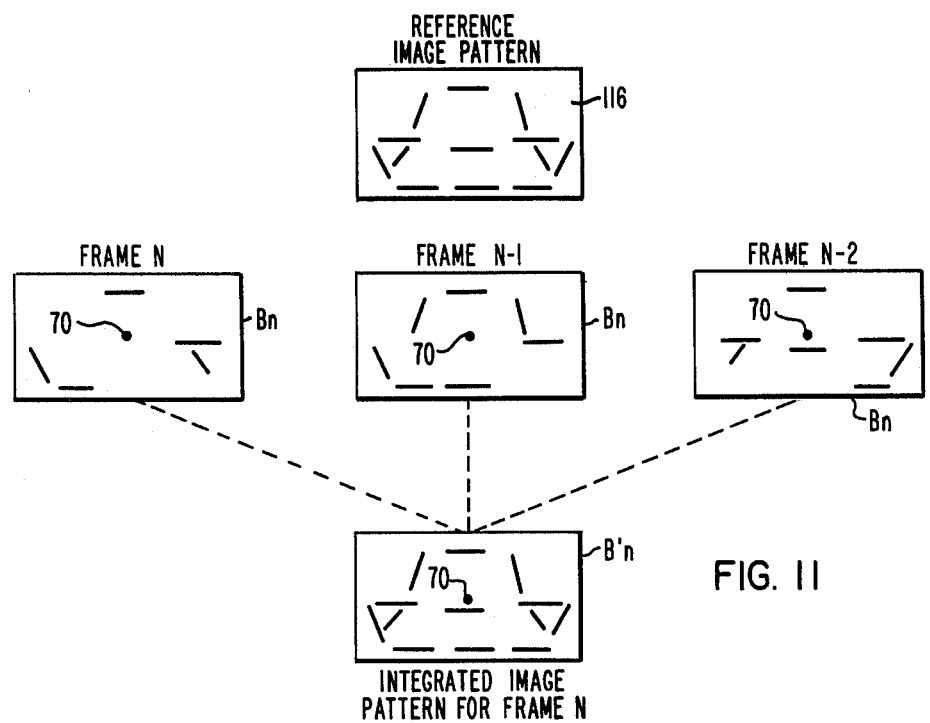
FIG. 11 is a sketch illustrating the integration process to form a composite line segment image pattern suitable for use in the integator unit of the embodiment depicted in FIG. 1.

For those blobs of the frames N and N−1 which have been identified as belonging to a common candidate object and registered to a common area reference point, integration of the line segments thereof by the unit 50 forms a composite line segment image in each case. An example of this integration process is illustrated by the sketch of FIG. 11. In an integration sequence of frames N, N−1 and N−2, for example, the blob Bn is identified as belonging to a common candidate object. Thus, for the frame N, the area reference points thereof are mutually registered to the same point 70 with respect to the frame reference point common to all of the frames in the integration sequence. In so doing, the line segments within each of the blobs Bn may be superimposed and integrated to form the composite line segment image pattern as shown by the block B'n.

Figure 10:
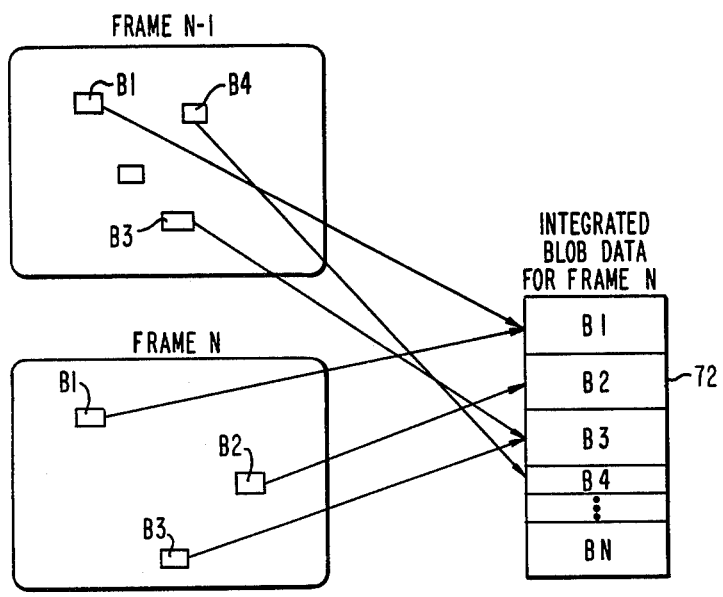
FIG. 10 is a sketch which illustrates the frame-to-frame integration of identified indexed areas and the storage of the integrated information into a similar block of memory in accordance with that depicted in the block diagram of FIG. 1.

Accordingly, the integration process performed by the unit 50 may continue for as many frames in the integration sequence of frames as are felt necessary with the blobs of the frames being correlated to identify common candidate objects. The resulting frame-to-frame integrated blob data may be stored in another memory 72 via signal lines 74 (see FIG. 1). An illustration of the integration process for a number of extracted blobs of two separate frames N and N−1 is exemplified in the sketch of FIG. 10. For example, the extracted blobs like B1 and B3 are identified as belonging to respective common candidate objects and the derived line segment data associated therewith are integrated into cellular arrays of the memory 72 having addresses respectively corresponding thereto. Other blobs like B2 and B4, for example, may be identified by the unit 50 as not belonging to a common candidate object, therefore the line segment data information associated therewith may be stored in separate cellular array locations in the memory 72 without integration thereof. Accordingly, the correlation and frame-to-frame integration process is carried out by the unit 50 for each frame of the integration sequence to form the various composite image patterns for the extracted blobs of the image frames. It is understood that the signature features of the line segments of the integrated composite image pattern for each blob are also integrated and stored in the corresponding cellular arrays of the memory 72.

For image object classification purposes, reference object image pattern sets for a predetermined number of reference objects may be stored in a reference memory denoted by the block 76 in FIG. 1. Each set of image patterns belonging to a common reference object may comprise image patterns at a variety of aspect views of the object and image patterns at a variety of ranges from the object, for example. For the present embodiment, each reference object image pattern may include a line segment set including both the positional index and gradient vector signature features of the individual line segments. Range data from the object as viewed by the sensor 20 may be provided to the memory 76 to access the corresponding sets of image patterns and signature features associated therewith. In addition, a conventional feature computer 78 may be used to process the integrated frame information from the memory 72 in accordance with the appropriate aspect view of the candidate object and pass along additional data to the reference signature memory 76 in order to better define the set selection of reference object image patterns for consideration in classifying the candidate objects.

A classifier unit 80, which may be a programmed processor, for example, is disposed in the electro-optical system embodiment of FIG. 1 and coupled to the memories 72 and 76 for correlating the various composite image patterns formed for the candidate objects with the selected set of reference object image patterns. For the present embodiment, the line segments of an integrated composite image of an indexed array accessed from the memory 72 are correlated in the classifier unit 80 with the line segment sets of the reference object image patterns selected from the memory 76 in accordance with the signature features thereof. A correlation value or score is generated by the classifier 80 for each reference object image pattern correlated with an integrated composite image pattern representing the candidate object. The classifier 80 may store each of the individual scores in a memory denoted by the block 82.

As the scores are generated for each of the line segment sets of the reference object image patterns, the classifier 80 may select one of the correlation values for comparison with a threshold correlation value derived by the threshold computer 84. Preferably, the correlation value is selected according to the largest generated correlation value of the set for comparison with the threshold correlation value. Consequently, the classifier 80 may classify the candidate object represented by the accessed composite image pattern as the reference object corresponding to the selected correlation value when the selected correlation value exceeds the threshold correlation value provided thereto from the computer 84 via signal line 86.

Figure 12:
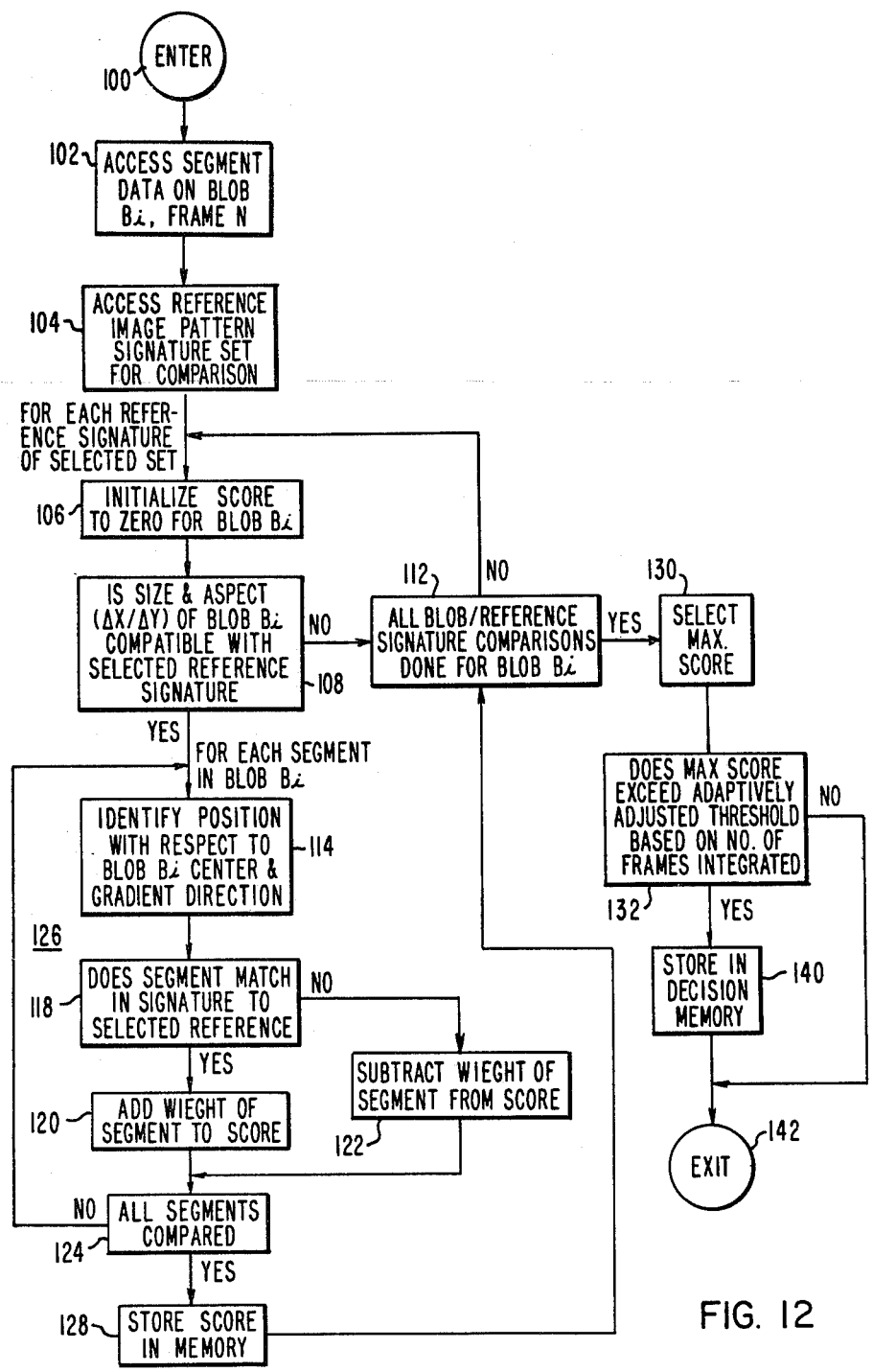
FIG. 12 is a signal flow diagram which may be used to program a processor suitable for use as the classifier unit in the embodiment of FIG. 1.

An exemplary signal flow diagram typical of that which may be used for programming the processor classifier 80 is shown in FIG. 12. Generally, the program may be entered at 100 any time during the classification procedure for the integrated image pattern of a blob Bi in a frame N within the integration sequence of frames of the unit 50. In block 101, the classifier 80 may access the composite line segment image data and signature features associated with the blob Bi from the appropriate cellular array in memory 72 having an address corresponding thereto for the frame N. Furthermore, in block 104, the classifier 80 may access from the memory 76 an image pattern from the set of reference object image patterns corresponding, for example, to the range and aspect views of each reference object being considered. The program sequence may next enter a signal flow outer loop to be executed for each of the reference object image patterns being considered for correlation.

The initial block 106 of this outer loop initializes the score or correlation value to 0 for the blob Bi and the next block 108 of the program sequence may be executed to perform a prescreening operation to determine if the selected indexed area or blob Bi is compatible with the selected reference image pattern in size and aspect thereof. The size and aspect information may be provided to the classifier 80 from the conventional feature computer 78 over signal lines 110 as shown in the embodiment depicted in FIG. 1. If the instructions of block 108 determines no compatibility, the other instructional blocks of the outer loop are bypassed and program execution is continued at block 112 wherein it is determined if all of the blob-reference signature comparisons are done for the accessed blob Bi. Otherwise, the next block 114 in the sequence is executed.

As program execution exits block 108 with a positive or yes decision, it enters into instructional block 114 which is the initial block of a subloop in which the line segments of the accessed blob Bi are compared one by one with the line segments of the selected reference object image pattern in accordance with the signature features associated therewith. An example of a reference object image pattern of line segments is shown by the blob 116 in FIG. 11. Ostensibly, in this example, the line segment pattern of the reference object appears to match very well with the composite line segment image pattern of the integrated blob B'n in FIG. 11 and thus, a high correlation value or score would be anticipated.

In block 114, the positional index of a selected line segment of blob Bi with respect to the blob center is identified along with the gradient direction thereof (see FIG. 7, for example). In block 118, the signature features of the selected segment are compared with each of the signature features of the line segments of the selected reference object image pattern to determine if there is a match in signature features. Generally, the gradient directions are directly compared to discriminate or focus onto just a few line segments. Then, the positional indexes of the discriminated line segments are compared to establish congruency within predetermined tolerance limits. If there is line segment congruency in accordance with the above-mentioned criteria, then a weighted value corresponding to the selected segment is added to the correlation value or score of the instant correlation. Conversely, if it is determined that the selected line segment of the blob Bi is not matched with any of the line segments of the selected reference image pattern then a weighted value corresponding to the selected line segment is subtracted from the score.

The adding and subtracting operations for deriving the correlation value are performed by the blocks 120 and 122, respectively, in the signal flow graph of FIG. 12. Block 124 thereafter determines if all the line segments of blob Bi have been compared and if not the sub-loop denoted as 126 is continued for each segment of the blob Bi. Otherwise, the final correlation value or score is stored in the score memory 82 in a cell corresponding to the reference object image pattern associated therewith. Thereafter, program execution is continued at block 112 wherein it is determined if all of the correlations for the image patterns of the selected set for the reference objects have performed with respect to the blob Bi. If not, the outer loop of the signal flow diagram is again executed for another selected reference object image pattern; otherwise, the max score of the correlations for blob Bi is selected from the memory 82 by the program execution of block 130 and compared with the threshold correlation value attained from the computational block 84.

Figure 13:
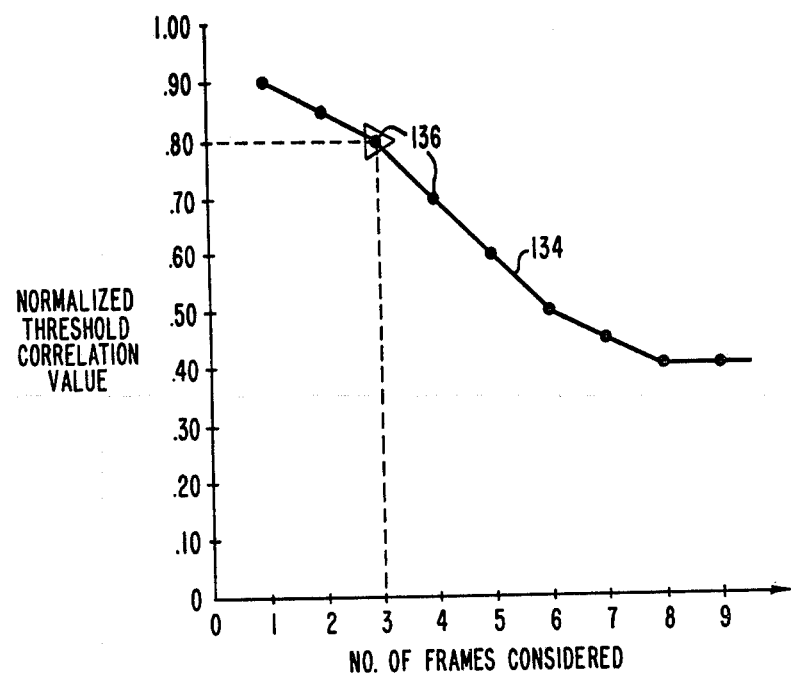
FIG. 13 is a graph which illustrates the adaptive selection of a threshold correlation value for use in the classifier unit of the embodiment depicted in FIG. 1.

In accordance with another aspect of the present invention, an adaptive threshold derivation may be performed by the computer 84 for deriving the threshold correlation value in accordance with the number of frames considered in the integration sequence by the unit 50. A correlation value may be selected from a set of values in accordance with the frame N being considered by the classifier unit 80 in the integration sequence of the unit 50. An example of such a set of threshold values is depicted in the graph of FIG. 13 wherein the ordinate of the graph contains a normalized indexing of threshold correlation values with respect to a maximum threshold correlation value and the abscissa is indexed in accordance to the frames of the integration sequence of unit 50.

In operation the adaptive threshold computer 84 may determine which frame in the integration sequence exists when a threshold correlation value is being accessed by the classifier 80. For example, if the unit 50 is in the third frame of the integration sequence at the time the classifier is accessing a threshold correlation value, the adaptive threshold computer may select a value corresponding 8 of the maximum threshold correlation value in accordance with the solid line curve 134 of FIG. 13 which defines the set of threshold values denoted by the dots 136 along the curve 134 corresponding to the integration frame sequence. According to this aspect of the present invention then, the program execution block 132 of the processor classifier 80 may access from computer 84 an adjustable threshold correlation value based on the frame number of the integration sequence corresponding to the comparison time.

Thus, in block 132, the max score selected by the block 130 may be compared with the adaptively selected threshold correlation value to establish classification. Should the max score exceed the selected threshold correlation value, there may be a decision to classify the candidate object represented by the line segment image pattern of blob Bi as the reference object corresponding to the max score selected. This decision may be stored in a decision memory 138 as instructed by the instructions of block 140. In the event the max score does not exceed the selected threshold correlation value, the program may be exited at point 142 with no classification being made.

While the generation of a threshold correlation value has been described in connection with the computer 84 hereabove, it is understood that, in some cases, the classifier 80 itself may compute a threshold correlation value based on the set of correlation values generated during each correlation process. Generally, the need for a threshold value is predicated on whether or not the correlation values resulting from the correlation process distinctly discriminate one reference image pattern over another. For example, in the event, the set of correlation values generated by the classifier 80 represents a randomly generated set with no clear distinction of one value over another, then for the most part, no classification can be made and under these conditions, there is usually no need for a threshold correlation value.

In another aspect of the present invention, a decision smoother unit 150 may be included in the electro-optical system embodiment of FIG. 1 and coupled to both the classifier 80 and decision memory 138 for the purposes of improving the classification process by classifying a candidate object as a selected reference object based on the number of correlations for which a classification is made by the classifier unit 80. More specifically, the classifier unit 80 may, in addition to storing the classification decision in memory 140 further generate a classification signal which may be provided to the decision smoother 150 over signal line 152 for each comparison of the classifier unit 80 for which the corresponding derived correlation value or score exceeds the threshold correlation value. Accordingly, the decision smoother unit 150 may have access to the information of prior classification decisions from the decision memory 138 utilizing the signal lines 154. As a result, the unit 150 may generate a final classification determination for the selected candidate object based on decision smoothing criteria taking into account a plurality of classification decisions corresponding to the selected candidate object.

Examples of decision smoothing criteria of the unit 150 may be:

1. identifying if a blob or indexed area is classified at least twice for a reference object type;

2. identifying if the blob or indexed area is classified in at least 50% of the integration frames since the first classification frame;
3. identifying if a blob or indexed area is classified as a common reference object type for more than 50% of the classifications; and
4. removing the classification decision of a candidate object from the decision memory 138 after it has not been classified for three consecutive frames.

It is understood that the aforementioned criteria for the decision smoother unit 150 is merely exemplary of the type of decision smoothing which can provide an improvement in the classification process. However, the decision unit 150 should not be limited solely to the criteria mentioned above, especially in the case in which more or less stringent criterias may be desired. In the event that the classifications of a candidate object passes the criteria set by the decision smoother unit 150, an object label may be assigned to the candidate object in the label assigner block 156 and the candidate object and assigned label may be displayed on a display unit 158 which may be a cathode ray tube (CRT) or the like (see FIG. 1) for human observation or provided to other systems for subsequent processing.

In summary, the embodiment described in connection with FIG. 1 is directed to an electro-optical system which provides an improved but yet simple technique for integrating the signature features of the line segments of an extracted indexed area representative of a candidate object to form a composite image pattern of line segments in the indexed area which significantly increases the amount of signature features available for a classification process. Needless to say, this increases classification accuracy even under adverse conditions such as long range and low signal-to-noise ratios. Because the correlation process involves overlaying the segments for indexed areas identified as being representative of a common candidate object from different samples, such as successive image frames, for example, to form the composite line segment image pattern, a more complete description of the candidate object is provided to minimize the effect of individual random edges caused by noise. The formed composite line segment image pattern of the candidate object naturally reinforces the primary signature features since they occur more frequently, thus improving the discrimination between the various reference object image patterns.

Furthermore, if there is obscuration or background merging of a candidate object with other portions of the scene, the integration process from frame-to-frame will assimilate the differences and tend to result in a more complete object definition in the composite line segment image pattern provided than would be available in the sole processing of individual frames. The formation of the composite line segment image pattern for each indexed area or blob, therefore, improves the classification accuracy, especially under adverse conditions where performance is most critical.

While a preferred method of classification was described hereinabove in connection with the operation of the classification unit 80, it is understood that more conventional generalized feature decision classification techniques such as described in the aforementioned U.S. Pat. Nos. 3,636,513; 3,638,188; and 3,748,644 may also be suitable for the classification process in connection with the preferred embodiment of FIG. 1. Going a bit further, it has even been proposed that these more conventional generalized feature classification methods function in combination with the aforementioned classification methods in the embodiment depicted in FIG. 1 to further improve the accuracy of the classification process.

Moreover, the classification method described in connection with the embodiment of FIG. 1 above may be considered as an intermediate form of temporal filtering, because the indexed areas or blobs representing the candidate objects are correlated and registered from frame-to-frame in order for the integration process to form the composite line segment images. However, applicants contend that the preferred embodiment described supra is much simpler than the pixel integration process described in the Background section hereabove for several reasons including the following:

1. only the indexed areas representing candidate objects are considered which greatly reduces the computational complexity and eliminates the need to consider geometric distortions that can occur over the entire field of view of this sensor;
2. for the integration process, a registration accuracy to the nearest pixel is adequate for line segment overlay which is much simpler as compared to the fractional accuracy required for the pixel integration process; and
3. the segment registration for the indexed areas may provide the registration for subsequent decision smoothing.

Needless to say, while the principles of the present invention have been described in accordance with the block diagram schematic embodiment of FIG. 1 in connection with the accompanying supporting FIGS. 2-13, it is understood that additions or modifications may be made to the preferred embodiment without deviating from said principles. Accordingly, applicants' invention should not be construed in connection with any one embodiment, but rather defined by the broad scope and breadth of the claim recitation to follow.

We claim:

1. An electro-optical system for processing image information of a plurality of frames, sequentially generated from an electro-optical sensor and representative of a field of view thereof, in order to extract and classify candidate object image patterns in said image frames in accordance with a set of reference object image patterns and a signature feature set associated with each reference pattern, said system comprising:

means operative to extract image patterns belonging to candidate objects from each of the plurality of sequentially generated frames and to derive a set of signature features associated with each image pattern extracted;

first means for correlating said image patterns extracted from frame-to-frame to identify extracted image patterns belonging to common candidate objects;

means for integrating the correlated extracted image patterns belonging to the identified common candidate objects to form a composite image pattern of each candidate object and a composite signature feature set associated therewith;

second means for correlating a formed composite image signature feature set with the signature feature sets of selected reference object image patterns to generate a corresponding set of correlation values;

means for generating a threshold correlation value; and means operative to classify a candidate object as a reference object based on a comparison between a selected one of said generated correlation values associated with said candidate object and said threshold correlation value.

2. An electro-optical system in accordance with claim 1 wherein the generating means includes means for selecting a threshold correlation value from a predetermined set of values corresponding to the number of sequentially generated frames used by the integrating means in forming the composite image pattern of the candidate object being classified.

3. An electro-optical system in accordance with claim 1 wherein the integrating means includes means for forming a composite image pattern of the candidate object for each frame of an integration sequence of frames by combining the correlated extracted image patterns belonging to the candidate object from the preceding frames of said integration sequence; wherein the second correlating means includes means for generating a set of correlation values for each frame in said integration sequence based on the formed composite image pattern corresponding to said each frame; and wherein the classifying means includes means for generating a classification signal for each frame of said integration sequence for which the corresponding selected correlation value exceeds the threshold correlation value.

4. An electro-optical system in accordance with claim 3 wherein the classifying means further includes means for classifying the candidate object as a reference object based on the number of frames in said integration sequence for which a classification signal is generated.

5. An electro-optical system in accordance with claim 3 wherein the threshold correlation value generating means includes means for selecting a threshold correlation value from a predetermined set of values corresponding to each frame in said integration sequence.

6. An electro-optical system in accordance with claim 3 wherein the classifying means includes means for selecting the largest correlation value of the set of correlation values generated for each frame of said integration sequence as the selected candidate object correlation value for comparison with the threshold correlation value of the corresponding frame.

7. An electro-optical system in accordance with claim 1 wherein the extracting means includes means for extracting from a frame of information at least one cluster of picture elements (pixels) having an intensity gradient with their surrounding pixels and for indexing an area of pixels including each cluster with respect to a reference point of said frame; means for extracting pixels along selected gradient edges within each indexed area to form line segments; and means for indexing a line segment with respect to a reference point of its corresponding indexed area and for deriving a contrast gradient vector for each extracted line segment of an indexed area, whereby each indexed area constitutes at least a portion of a candidate object and the index and gradient vector of each line segment of said indexed area belong to the set of signature features of said candidate object for each frame.

8. An electro-optical system in accordance with claim 7 wherein the first correlating means includes means for comparing the indexed areas of one frame with those of another frame to identify indexed areas from frame-to-frame belonging to a common candidate object; and wherein the integrating means includes means for integrating the line segments of indexed areas identified as belonging to a common candidate object to form an indexed area having a composite line segment image.

9. An electro-optical system in accordance with claim 8 wherein the first correlating means includes means for identifying common indexed areas from frame-to-frame by determining an overlap of at least a portion of the indexed areas mutually registered to a common frame reference point.

10. An electro-optical system in accordance with claim 8 wherein the integrating means includes means for superimposing the identified common indexed areas with respect to a common indexed area reference point to integrate the line segments thereof to form the composite line segment image.

11. An electro-optical system in accordance with claim 8 wherein each reference object image pattern includes a set of line segments each having an index and gradient vector associated therewith; and wherein the second correlating means includes means for correlating the line segments of the integrated composite image of an indexed area with the line segment sets of selected reference object image patterns in accordance with the index and gradient vector signature features of the individual line segments to generate a correlation value for each reference object image pattern.

12. An electro-optical system in accordance with claim 11 wherein the classifying means includes: means for selecting a generated correlation value for comparison with the threshold correlation value; and means for classifying the candidate object as the reference object corresponding to said selected correlation value when said selected correlation value exceeds the threshold correlation value.

13. An electro-optical system in accordance with claim 12 where the classifying means includes means for selecting the largest generated correlation value for comparison with the threshold correlation value.

* * * * *